Oct. 30, 1962   R. K. BRAMLEY   3,061,049
BRAKING SYSTEM
Filed July 18, 1960   2 Sheets-Sheet 1

INVENTOR.
ROBERT K. BRAMLEY
BY

ATTORNEYS

Oct. 30, 1962 R. K. BRAMLEY 3,061,049
BRAKING SYSTEM
Filed July 18, 1960 2 Sheets-Sheet 2

INVENTOR.
ROBERT K. BRAMLEY
BY
ATTORNEYS

United States Patent Office

3,061,049
Patented Oct. 30, 1962

3,061,049
BRAKING SYSTEM
Robert K. Bramley, Cleveland, Ohio, assignor to
William S. West
Filed July 18, 1960, Ser. No. 43,364
8 Claims. (Cl. 188—21)

My invention relates to braking systems and particularly to braking systems for vehicles with swivelable caster wheels. The particular use of my invention is in its application to a vehicle, such as for example, a hand-pushed dump cart utilized in moving material, such as mortar and the like about a building construction project. Such dump carts usually have a pair of wheels at one end which do not swivel and a pair of caster wheels at the other end which do swivel. It is highly desirable that the swivelable caster wheels be braked or locked against rotation when the cart is at a position where it is desired that it remain stationary and without accidental movement. It is particularly desirable that the brakes be applied to the swivelable caster wheels automatically when the vehicle, such as a dump cart, has reached its position where further movement is to be suspended, such as at a location where the contents of the cart are to be loaded or unloaded.

If the non-swivelable wheels of the cart are locked and the swivelable wheels are not locked or braked, then side movement or thrust against the side of the cart adjacent the end where the swivelable wheels are located tends to dislodge the cart and cause it to move, and particularly so if the non-swivelable wheels are not on a perfectly flat plane and hence not in firm engagement with the supporting surface. If only one of the non-swivelable wheels, when braked, is in engagement with the supporting surface, such as the ground or a platform, and there is side thrust against the end supported by the swivelable wheels, but which swivelable wheels are not locked, then the cart can swing around and dangerously move out of position or move so far as to fall off a platform or other elevated surface.

My invention has as an object the provision of imbrake the swivelable wheels of a cart so as to firmly lock or brake both of the pair of swivelable wheels adjacent one end of the cart.

Another object is the provision for automatically applying the brakes to the swivelable caster wheels of a cart as soon as movement of the cart in a forward or rearward direction has ceased.

Another object is the provision for automatically releasing the brakes applied to the wheels of a cart when an operator or user of the cart pushes or pulls the cart so as to move it from a location.

Another object is the provision for automatically applying the braking system to wheels of a cart as soon as the operator or user has stopped pushing or pulling the cart upon the cart's reaching a desired location.

Another object is the provision of apparatus for automatically applying and releasing brakes to swivelable wheels of a cart or other vehicle having a pair of swivelable wheels adjacent one end of the vehicle.

Another object is the provision for readily and conveniently controlling the braking system wherein a swivelable wheel of a cart or other vehicle is to be locked or braked upon the cart's reaching a location where further lateral movement of the cart is undesired.

Another object is to provide improved apparatus producing new and superior results in a manner heretofore unknown.

Other objects and a fuller understanding of the invention may be had by referring to the following description and claims, taken in conjunction with the accompanying drawings, in which:

FIGURE 1 is an end view of a four-wheeled cart, such as a dump cart used for hauling mortar about a building construction project, and showing the braking system as applied to the rearward end of the cart. Only a pair of swivelable caster wheels are shown at the end where the braking system is applied and it is to be understood that a pair of non-swivelable wheels are located adjacent the forward end of the cart, not shown;

Figure 1:
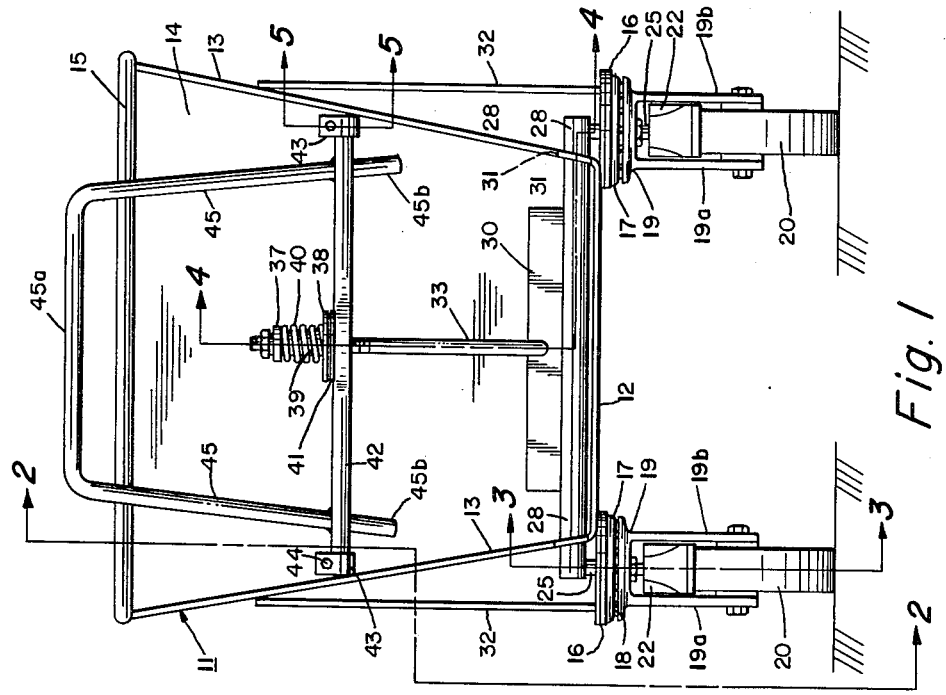

The cart illustrating an embodiment of my invention applied thereto is denoted generally by the reference character 11. This cart has a rectangular tub or container made up of metal sheets or plates adapted to hold mortar, sand or other building material. The cart has a bottom wall 12 disposed in a horizontal plane and extending upwardly and outwardly from the bottom wall 12 and diverging therefrom are side walls 13. A front end wall, not shown, completes the forward end of the container. A rearward end wall 14 disposed at an incline completes the walls of the container at the rearward end of the cart. The side walls and end walls at their upper edges form a rectangular shaped top edge portion 15, the container being open within the top edge portion 15.

Welded to the container of the cart and particularly to the bottom wall 12 thereof are supporting plates 16 at the rearward corners of the cart and disposed in a horizontal plane. The plates 16 in effect are extensions of the bottom wall 12.

Secured by welding or other suitable means to the bottom of each plate 16 adjacent the rear corners of the cart is a round caster base or raceway 17. Secured to each caster base or raceway 17 is a caster yoke member 19. The horizontal transverse portion of the yoke member 19 is axially aligned with the caster base or raceway 17. Interposed in appropriate ball channels formed in the opposed surfaces of the caster base 17 and the yoke member 19 are a plurality of ball bearings 18 providing a good bearing interengagement between the yoke member 19 and the caster base 17.

A caster wheel 20 is journaled to each yoke member 19 by an axle 21 extending through the axis of the wheel 20 and through aligned openings in side portions 19a and 19b of the respective yoke member 19. The yoke side portions 19a and 19b are disposed at an incline to the axis of the caster member 17 in the usual manner of the mounting for caster wheels.

There is a hollow kingpin or hollow pintle 23 having its head secured by welding or other suitable means to the under-part of each plate 16. This kingpin or hollow pintle 23 is disposed axially of the caster base 17 and yoke member 19. A nut 24 is threadably engaged to the lower end of the pintle 23 so as to hold or lock the yoke member 19 in position in relationship to the caster base 17 and the pintle 23. The yoke member 19 is free to revolve around the pintle 23 by the bearing engagement of the ball bearings 18 intermediate of the caster base 17 and the yoke member 19. Thus, the pintle 23 remains stationary and the yoke member 19 is free to rotate about the axis of the pintle 23.

Figure 3:
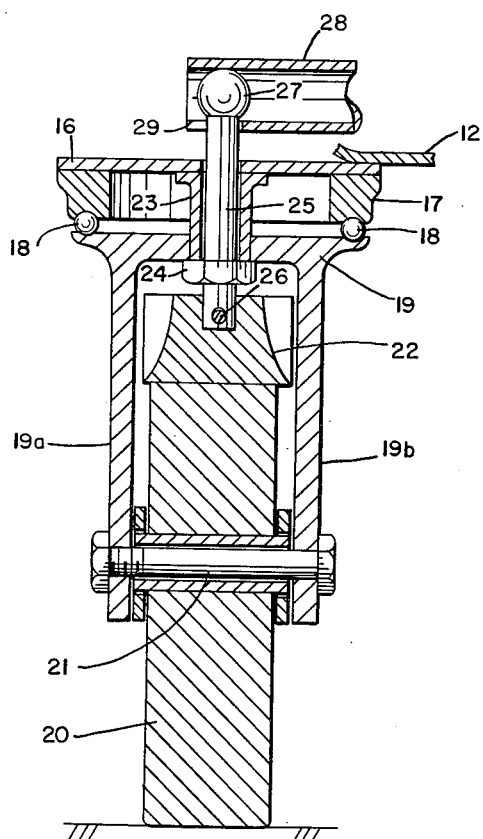
FIGURE 3 is an enlarged sectional view showing the details of the mounting of the braking system associated with one of the swivelable caster wheels and taken through the line 3—3 of FIGURE 1.

As seen in the drawings, and particularly in FIGURE 3, there is a cylindrical opening extending through the pintle member 23 and also extending through the plate 16.

This opening extends from above the plate 16 to below the nut 24 so as to provide a cylindrical bore extending axially of the pintle 23 and yoke member 19.

Figure 2:
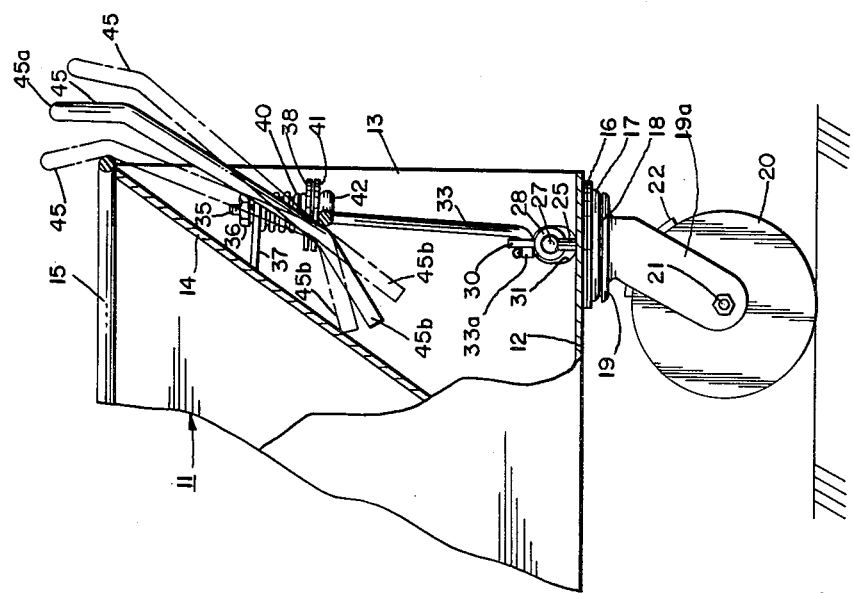
FIGURE 2 is a view partially in section of the cart shown in FIGURE 1 and looking in the direction of the arrows 2—2 of FIGURE 1.

Extending through this bore or hollow opening through the plate 16 and through the pintle 23 is an actuating pin or rod 25 disposed in axial alignment with the pintle 23. Secured to the lower end of the actuating pin 25 at a location beneath the nut 24 is a brake shoe member 22. A fastening element 26 interconnects the end of the actuating pin 25 with the brake shoe member 22. As seen in FIGURES 1, 2 and 3, there is a brake shoe 22 disposed about each of the swivelable caster wheels 20 so as to frictionally engage the circumferential surface of an upper sector of the wheel upon the brake shoe 22 being moved downwardly toward the axis of the wheel 20. Inasmuch as there are two swivelable wheels 20 at the rearward end of the cart, there are corresponding mountings for the swivelable wheels and of the brake shoes therefor at each of the opposite rear corners of the cart. In other words, the detailed construction shown in FIGURE 3 is similar for each of the swivelable wheels 20 shown in FIGURE 1 of the drawings.

There is formed on the upper end of each of the actuating pins 25 a ball-end portion 27, this ball-end portion 27 being either formed integrally with the cylindrical portion of the pin 25 or otherwise secured thereto so that raising and lowering of the ball-end portion 27 also raises and lowers the entire pin 25 and parts carried thereon. By reason of the interconnection 26, the brake shoe 22 is raised and lowered by vertical movement of the actuating pin 25 as the ball-end portion 27 is correspondingly raised and lowered.

Extending across the rear portion of the cart 11 under the inclined rear end wall 14 and adjacent the bottom wall 12 is a hollow crossbeam 28. This crossbeam 28 is in the form of a hollow pipe. Extending from the opposite ends of the crossbeam 28 and cut into the lower wall of the crossbeam 28 is a slot 29. There is a slot 29 at each of the opposite ends of the crossbeam 28. As may be seen in FIGURES 2 and 3, each slot 29 has a width sufficient to accommodate the cylindrical portion of an actuating pin 25, which is sufficiently narrow to prevent the ball-end 27 from moving downwardly through the slot 29. The ball-end 27 of each actuating pin 25 is introduced into the end of the crossbeam 28 by relative movement of the ball-end portion 27 and the crossbeam 28 along the axis of the crossbeam 28 so as to position the ball end portion 27 within the respective end of the crossbeam 28 as shown in the drawings. There is a reinforcing plate or beam 30 welded or otherwise secured to the crossbeam 28 intermediate its opposite ends so as to provide additional rigidity and strength to the crossbeam 28.

Extending through the opposite side walls 13 at a location rearwardly of the inclined end wall 14 and just above the bottom wall 12, there are aligned openings 31 of oval shape which are provided to permit the opposite end portions of the crossbeam 28 to extend through the side walls 13 and to permit a limited amount of up and down movement of the crossbeam 28 relative to the bottom wall 12. In order to protect the opposite end portions of the crossbeam 28 and the actuating pins 25 extending upwardly from the plates 16 there is provided at each rear corner of the cart a guard portion 32. This guard portion 32 is of generally angular shape, the side walls of which are wider near the bottom of the cart and relatively narrow as the side walls of the guard member 32 approach the top of the cart. The guards 32 at each rear corner of the cart are readily removable to provide access to the parts enclosed thereby.

As a location substantially equidistant of the opposite ends of the crossbeam 28, there is provided in the reinforcing plate 30 a round opening 30a. Extending upwardly from the crossbeam 28 and reinforcing plate 30 is an upright rod 33. The lower end of the rod 33 is bent at right angles to the main body of the rod 33 to form a bent-over portion 33a. This bent-over portion 33a fits loosely within the round opening 30a extending through the reinforcing plate 30. A cotter pin 34 or other suitable means holds the upright member 33 to the reinforcing plate 30 in such a manner that pivotal action of the reinforcing plate 30 relative to the bent-over portion 33a is permitted. At the same time raising and lowering of the upright rod 33 raises and lowers the reinforcing plate 30 and crossbeam 28 which is welded thereto. By reason of the pivotal action that is permitted, an equalizing action is provided and the pull and push on the opposite ends of the crossbeam 28 is substantially the same. In other words, the force of raising and lowering the opposite end of the crossbeam 28 is substantially uniformly distributed upon the raising and lowering of the crossbeam 28 and reinforcing plate 30 at its intermediate location by the upright member 33.

The upper end portion of the upright rod 33 has a threaded end portion 35. A nut 36 is threadably engaged to the upper end of the rod 33 at an adjustable distance from the extreme upper end of the rod 33. Also threadably engaged to the threaded end portion 35 at a distance below the nut 36 is an upper washer member or plate 38 in such manner that raising and lowering of the washer 38 raises and lowers the upright member 33 in correspondence thereto. Positioned between the upper washer 38 aand the nut 36 is a sleeve member 39 which loosely fits over the threaded end portion 35 of the upright rod 33, this sleeve 39 being firmly held in position by the nut 36 in engagement therewith. A coil spring 40 surrounds the sleeve 39 and the central portion of the upper washer 38. The sleeve 39 prevents the coil spring 40 from frictionally engaging the threaded end portion 35 of the upright rod 33 and aids in holding the coil spring in axial alignment with the rod 33.

A bracket member 37 extending in substantially horizontal plane is secured by welding or other suitable means to the end wall 14 of the cart. This bracket member 37 has an opening 37a extending therethrough which accommodates the sleeve 39 and rod 33 within the sleeve 39. There is a sliding fit of the sleeve 39 within the opening 37a so that the internal wall of the opening 37a acts as a guide for up and down movement of the rod 33. Also the top surface of the bracket member 37 acts as a stop below which the nut 36 cannot move and thus limits downward movement of the rod 33. The bias of the coil spring 40 is such that the upper end of the spring 40 presses on the lower surface of the bracket 37 and the lower end of the spring 40 presses downwardly upon the upper washer 38 and thus resiliently urges the upper washer 38 in a downward direction. This downward urging of the upper washer 38 in turn urges the upright rod 33 downwardly and simultaneously urges the crossbeam 28 downwardly, which in turn urges the actuating pins 25 and brake shoes 22 carried thereby in a downward direction. In other words, the bias of the coil spring 40 is such as to always urge both brake shoes 22 against both of the swivelable wheels 20 so as to frictionally engage and brakingly lock the same. By reason of the interconnection of the rod 33 with the reinforcing plate 30 secured to the crossbeam 28, this resilient urging of the brake shoes 22 into braking position is uniformly distributed to both of the brake shoes 22 so that braking action is substantially equalized on both of the pair of swivelable wheels 20.

Figure 4:
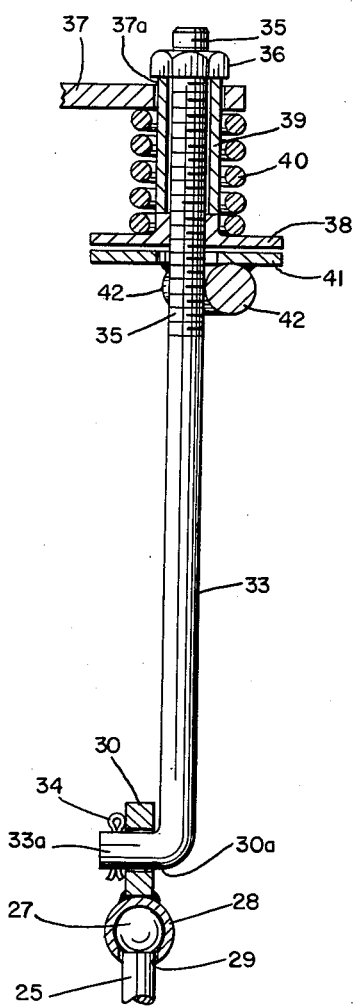
FIGURE 4 is an enlarged sectional view taken through the line 4—4 of FIGURE 1.
Figure 5:
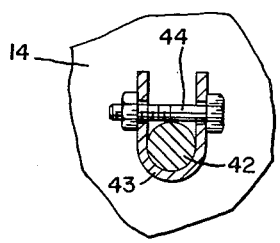
FIGURE 5 is an enlarged sectional view taken through the line 5—5 of FIGURE 1.

Axially aligned with the upper washer 38 is a lower washer or plate 41. The washers 38 and 41 have opposed surfaces which are uniformly spaced apart, as seen in FIGURE 4, upon the lower washer 41 being disposed in a horizontal plane as is the upper washer 38. This lower washer or plate 41 is loosely or non-threadably mounted about the upright rod 33. The opening extending axially through the lower washer 41 is relatively large so as to permit tilting of the lower washer 41 relative to the axis of the rod 33. The lower washer or plate 41 is welded to a rockable crossbar 42 which extends transversely of the cart in a horizontal plane just below the plane of the lower washer 41. The opposite end portions of the rockable crossbar 42 are pivotally carried in pivot supports 43. These pivot supports 43 are U-shaped metal straps welded to the end wall 14 and adjacent the side walls 13. The open ends of the U-straps forming the pivot supports 43 are closed by bolts 44. By removal of the bolts 44 from the pivot supports 43, the opposite ends of the rockable cross bar 42 may be removed from the pivot supports for disassembling of the parts for service or repair. The fit of the crossbar 42 in the spaced pivot supports 43 is loose enough to permit the crossbar 42 to pivot on its axis and thus to be rocked about its axis.

A handle member 45 in the form of a U-shaped pipe or bar is welded adjacent its opposite ends to the rockable crossbar 42. The open end of the handle 45 is directed downwardly and there are lower end portions 45b which extend downwardly and beyond the rockable crossbar 42. The horizontal upper portion of the handle member 45 is denoted by the reference character 45a. The operator or user of the cart, in pulling or pushing the cart, takes hold of the portion 45a of the handle 45 so as to move it toward or away from the body of the cart. When no force is applied to the handle 45, it is in the intermediate or neutral position shown in full lines in FIGURE 2. When the operator pushes upon the handle 45 to push the cart forwardly, the handle 45 assumes a position shown in broken lines with the upper portion of the handle 45 adjacent the upper edge portion 15 of the cart, as seen in FIGURE 2.

When the operator or user of the cart pulls the cart rearwardly by pulling on the handle 45, the handle member 45 moves to the position shown in broken lines and farthest away from the edge portion 15 of the cart. In other words, the handle 45 is shown in its neutral or intermediate position in full lines in FIGURE 2 and this is the position it assumes under the urging of the spring 40 when the handle 45 is neither pulled nor pushed. As seen in FIGURE 2, the lower ends 45b extend in a correspondingly opposite direction from that of the upper portion 45a. When the handle member 45 has been moved to its rearwardmost position, upon pulling the cart backward, then the lower end portions 45b swing forwardly toward and against the end wall 14 which thus provides a limit stop to movement of the handle 45. When the handle 45 is moved to the pushing or forward position, then the lower ends 45b move farthest away from the end wall 14 while the upper end of the handle 45 moves against the upper edge portion 15 of the cart, which also acts as a stop limit to movement of the handle 45 in the forward position.

By reason of the welded interconnection of the handle 45 and rockable crossbar 42, the pulling and pushing of the handle forwardly and rearwardly rocks the rockable crossbar upon its axis. The lower washer 41, being welded to the crossbar 42, tilts forwardly and tilts rearwardly as the crossbar 42 is rocked forwardly and rearwardly respectively. As the crossbar 42 is rocked by forward movement of the handle in pushing the cart, the hollow washer or plate 41 tilts relative to the axis of the upright member 33 and slidably engages the lower surface of the upper washer 38 and cammingly raises the upper washer 38 and consequently raises the upright rod 33 along its axis. Likewise, rocking of the crossbar 42 by rearward or pulling movement on the handle 45 upon pulling of the cart rearwardly moves the lower washer 41 to tilt relative to the axis of the upright member 33 to cause the lower washer 41 to slidably engage the opposed lower surface of the upper washer 38 and to cammingly raise the upper washer 38 and the upright rod 33 secured thereto along the axis of the upright rod 33. Thus, by the camming interengagement of the washers or plates 41 and 38 and the tilting of the lower washer 41 by the rocking of the crossbar 42 through the pulling and pushing of the handle 45, the upright rod 33 is raised in opposition to the resilient urging of the coil spring 40. The raising of the upright rod 33 in opposition to the resilient urging of the spring 40 causes the reinforcing plate 30 and crossbeam 28 secured thereto to move upwardly and thus to draw the actuating pins 25 upwardly in the hollow pintles 23. The force exerted by the upright rod 33 is equalized by the arrangement shown so as to apply equal raising force on the actuating pins 25 and braking shoes 22 carried thereby. Also the downward force exerted on the upright rod 33 by the spring 40 is equalized so as to apply substantially uniform pressure or downward force on the brake shoes 22.

To permit a small limited play of the handle 45 without actuating the lower washer 41 and hence without raising the upright rod 33, there is provided a relatively small space between the washer 38 and the washer 41 when the handle is in its neutral position or intermediate position shown in full lines in FIGURE 2. The nut 36 is positioned above the bracket member 37 a slightly greater distance than the spacing between the washers 38 and 41. The nut 36 acts as a stop to limit downward movement of the upright rod 33. The nut 36 also acts to hold the sleeve 39 in firmly assembled position with the upper washer 38 upon the rod 33.

It is seen that by the structural arrangement shown and described, upon the operator or user of the cart releasing or letting go of the handle 45 when he reaches the location where the cart is to remain stationary, the brakes are automatically applied by reason of the resilient urging of the spring 40 which forces the brake shoes 22 equally against the circumferential surface of the swivelable wheels 20. By reason of the axial alignment of the actuating pins 25 within the hollow pintles 23, the braking action is the same regardless of which way the wheels 20 may be swiveled or directed at the moment the brakes are applied. The braking action is the same regardless of the disposition of the swivelable wheels 20. The arrangement also provides that upon an operator or user of the cart pushing on the upper end of the handle 45, resilient urging of the spring 40 is automatically released, the upright rod 33 is raised and the brake shoes 22 are raised upwardly away from the swivelable wheels 20 so as to release the braking action. Also upon the operator or user pulling the cart backwardly by pulling the upper end portion 45a of the handle 45 rearwardly, that is to the right in FIGURE 2, the resilient urging of the coil spring 40 is automatically opposed and the rod 33 is raised to lift or draw the actuating pins 25 upwardly, which in turn raises the brake shoes 22 upwardly and out of braking position so as to permit the wheels 20 to freely rotate on their respective axles.

A safe and simple apparatus is here provided which is particularly adapted for use in vehicles of this general class wherein a cart, such as a dump cart, is pulled and pushed about a building construction project and finds its greatest utility in precarious positions, such as upon platforms and floors carried by scaffolding. Those acquainted with the dangers and difficulties inherent in the use of prior devices and of the limitations found in their uses will appreciate the advantages and benefits accruing from the functions made possible through the structure herein disclosed and described by way of example.

The present disclosure includes that contained in the appended claims, as well as that of the foregoing description.

Although this invention has been described in its preferred form with a certain degree of particularity, it is understood that the present disclosure of the preferred form has been made only by way of example and that numerous changes in the details of construction and the combination and arrangement of parts may be resorted to without departing from the spirit and scope of the invention as hereinafter claimed.

What is claimed is:

1. A brake system for a vehicle having a pair of swivel wheels spaced from each other transversely of the vehicle, each of said wheels being journaled on a yoke member pivotable relative to the vehicle about an upright axis, comprising in combination, a pair of pintle members journaled to said vehicle and connecting said yoke members, respectively, to said vehicle to permit each yoke member and wheel journaled thereon to swivel about a respective said upright axis, each said pintle member having a round opening extending axially therethrough, a pair of brake shoes each disposed relative to one of said swivel wheels to frictionally brake the same upon being moved against the respective wheel, a pair of actuating pins each extending axially through a said pintle member, respectively, and connected to a said brake shoe to move the brake shoe relative to a respective wheel upon axial movement of the actuating pin connected therewith, a beam member extending substantially horizontally and connected adjacent the opposite ends of the beam member to said actuating pins, respectively, to axially move said actuating pins upon movement of said beam member, an upright member pivotally connected adjacent the lower end to said beam member substantially equidistant of said actuating pins, a crossbar pivotally carried by said vehicle at a level above said beam member, a handle member connected to said crossbar to rock said crossbar upon pushing and pulling of said handle member, a first plate member connected to said crossbar to tilt upon rocking of said crossbar, a second plate member connected to said upright member and disposed adjacent said first plate member to engage the same and to move said upright member along the axis upon the tilting of said first plate member, a bracket member carried by said vehicle for guiding movement of said upright member along its axis, and a spring member intermediate said bracket member and said second plate member and biased to urge said second plate member to a position substantially parallel to said first plate member, the arrangement of said pintle members, actuating pins, brake shoes, beam member, upright member, crossbar, handle member, first and second plate members, bracket member and spring member being such that the bias of said spring member between said bracket member and second plate member urges said upright member along its axis in a first direction to move the beam member and actuating pins connected thereto to press the said brake shoes against said wheels, respectively, and such that pushing and pulling of said handle member to rock said crossbar and to tilt said second plate member to slidably engage and move said first plate member in opposition to the bias of said spring member moves said upright member in an opposite direction to move the beam member and actuating pins connected therewith to release the said brake shoes from said wheels, respectively.

2. A braking system for a pair of swivel caster wheels mounted on yokes having pintles, respectively, connected to a vehicle, said pintles having cylindrical openings extending axially therethrough, comprising the combination of, a pair of brake shoes each positioned adjacent one of said caster wheels to brakingly engage the same upon being moved to braking position and to release the same upon being moved to releasing position, a pair of actuating pins each extending axially through the cylindrical opening of a respective pintle and extending upwardly therefrom, the lower ends of the actuating pins being connected with the said brake shoes, respectively, to move the same to braking and releasing positions upon axial movement of the respective actuating pins relative to said pintles, a beam member connected adjacent its opposite ends to the said actuating pins extending upwardly from said pintles, respectively, an upright member connected to said beam member intermediate the ends thereof and extending upwardly therefrom, a rockable member pivotally carried by said vehicle, a handle member connected to and extending from said rockable member for rocking said rockable member in one direction upon pushing the handle member and for rocking the rockable member in an opposite direction upon pulling the handle member, a first plate member connected to said rockable member to tilt in said one direction upon the rockable member being tilted in said one direction and to tilt in said opposite direction upon the rockable member being rocked in said opposite direction, a second plate member connected to said upright member in juxtaposition to said first plate member, said plate members having opposed faces and being arranged so that tilting of said first plate member causes sliding interengagement of said plate members and the movement of said second plate member and upright member along the axis of the upright member, an abutting member carried by said vehicle guiding movement of said upright member along its axis, and a spring member positioned between said abutting member and said second plate member and biased to urge said second plate member toward said first plate member, the movement of said second plate member by said spring member toward said first plate member also resiliently urging said upright member to move along its axis in a direction to move said beam member and actuating pins in a direction to move said brake shoes into braking position, the tilting of said first plate member by the rocking of said rockable member moving said second plate member by the sliding interengagement of the plate members in opposition to the bias of said spring member to thereby move the upright member along its axis and camming said beam member and actuating pins to move in a direction releasing said brake shoes.

3. A braking system for braking a pair of caster wheels mounted on a vehicle to swivel on upright disposed pintles, respectively, each of said pintles having an opening extending axially therethrough, comprising in combination, brake shoe means adapted to brake each of said wheels upon being moved to braking position, actuating means extending axially through the opening in each said pintle, respectively, for moving the brake shoe means in and out of braking position, common operating means interconnected to the respective said actuating means to operate the same in unison, resilient means biasing said operating means to move in a first direction, movement of the operating means in said first direction moving both said actuating means to move in unison the brake shoe means into braking position, handle means rockingly carried by said vehicle to rockingly move upon being pushed and upon being pulled, and camming means interconnecting said handle means and said operating means to cammingly move said common operating means in an opposite direction in opposition to the bias of said resilient means upon the pushing and upon the pulling of said handle means, said camming means including a first part carried by said common operating means and a second part carried by said handle means to rock therewith and arranged to cammingly engage and move said first part in said opposite direction upon rocking movement of said second part.

4. In a braking system for a vehicle having a pair of caster wheels swivelable on pintles having axially disposed openings extending therethrough and a pair of brake shoes associated with said caster wheels, respectively, for braking the same, the combination of a pair of actuating means each extending axially through the openings of the respective pintles for actuating said brake shoes, mechanical linkage means connected to both said actuating means for actuating in common through said actuating means both of said brake shoes in unison, resilient means resiliently urging said mechanical linkage means toward a position moving through said actuating means both the brake shoes to brake said wheels, respectively, rockable means movable in either of opposite directions and operatively engaging said mechanical linkage means for operating said mechanical linkage means in opposition to said resilient means away from said position upon rocking of said rockable means in either of said opposite directions, and handle means connected to said rockable means for rocking said rocking means to operate said mechanical linkage means upon moving the handle means in either of opposite directions, said resilient means and rockable means being arranged in opposition to each other and being operatively interconnected with said mechanical linkage means at a point to provide substantially equal force to both said actuating means for actuating the respective brake shoes in braking and unbraking position.

5. In a braking system for a vehicle having a pair of caster wheels swivelable on pintles having axially aligned openings extending therethrough, apparatus for actuating a pair of brake shoes associated, respectively, with said caster wheels for braking the same, comprising actuating pins extending through the openings of said pintles in axial alignment therewith and engaging said brake shoes to actuate the same, a crossbar connected with both said actuating pins for moving each of the actuating pins along its respective axis, an operating member connected to said crossbar intermediate the ends thereof for moving both said actuating pins, resilient means urging said actuating pins in a direction to actuate the brake shoes to braking position, a rockable member rockable selectively in either of opposite directions, a handle member connected to said rockable member for rocking said rockable member in opposite directions, and a pair of opposed interengageable parts, a first of said parts being connected to said operating member to move the operating member along its axis upon movement of said first part, the second of said parts being carried by said rockable part to rock from an intermediate position to two opposite positions upon the selective rocking of said opposite directions, the interengagement of said parts moving the first part along the axis of the operating member upon the rocking of the second part from said intermediate position to either of said two opposite positions, the movement of said operating member along its axis by said first part being moved from said intermediate position opposing the said resilient means and moving the crossbar and actuating pins to release said brake shoes.

6. In a vehicle having a pair of spaced swivelable caster wheels mounted on pintles having axially disposed openings extending therethrough, respectively, the combination of a brake shoe disposed in juxtaposition to each of said caster wheels for braking the same, actuating pins extending through the opening of each of said pintles, respectively, and connected to the respective said brake shoes to actuate the same upon movement of the actuating pins along the axes of the respective pintles, common operating means for simultaneously moving both said actuating pins along the axes of said pintles, resilient means resiliently urging said common operating means in a direction to move the actuating pins substantially equally in a direction along said axes to actuate the brake shoes into braking position, camming means engaging said operating means and disposed to operate said operating means in opposition to said resilient means to move the actuating pins substantially equally in an opposite direction along said axes to actuate said brake shoes away from said braking position, and rockable means operatively connected to said camming means to operate the same upon rocking of the rockable means.

7. Apparatus for simultaneously controlling movement of a pair of brake shoes associated with a pair of vehicle wheels, respectively, swivelable about upright spaced axes, a pair of first means operable through said axes, respectively, and connected to the respective brake shoes for actuating the same in a first direction for providing braking action and a second direction for releasing braking action, second means for resiliently biasing said first means in said first direction, third means for cammingly opposing said second means and moving said first means in said second direction, and fourth means movable from a neutral position in opposite directions and connected to said third means for actuating the third means upon movement of the fourth means in either of said opposite directions, said second and third means being connected to both satid first means equidistantly from said axes and operating in unison both said first means with equal force.

8. In combination, brake means disposed in juxtaposition to swivelable caster wheels carried by pintles having openings extending axially therethrough, actuating means extending through the openings in said pintles to actuate the brake means, common operating means connected to said actuating means for operating both of the same in unison, resilient means engaging said common operating means for resiliently urging said operating means in a direction to operate the actuating means to actuate the brake means into braking position, camming means engaging said common operating means for moving said operating means in opposition to said resilient means in a direction to operate the actuating means to release the brake means from braking position, and rockable handle means connected to said camming means to operate the same upon rocking of the rockable handle means, said resilient means and said camming means being operatively connected to said common operating means at a point to obtain substantially equal movement of said actuating means.

References Cited in the file of this patent
UNITED STATES PATENTS

| | | |
|---|---|---|
| 422,245 | Miller et al. | Feb. 25, 1890 |
| 2,253,824 | Townsend et al. | Aug. 26, 1941 |
| 2,388,692 | House | Nov. 13, 1945 |
| 2,870,519 | Yeazel | Jan. 27, 1959 |
| 2,918,134 | Jensen | Dec. 22, 1959 |